United States Patent
Sutterlin

(10) Patent No.: US 12,215,408 B2
(45) Date of Patent: Feb. 4, 2025

(54) PROCESSES FOR THE SEPARATION OF RARE EARTH ELEMENTS AND NON-RARE EARTH ELEMENTS INTO INDIVIDUAL HIGH PURITY ELEMENTS

(71) Applicant: Inventure Renewables, Inc., Tuscaloosa, AL (US)

(72) Inventor: William Rusty Sutterlin, Tuscaloosa, AL (US)

(73) Assignee: INVENTURE RENEWABLES INC., Tuscaloosa, AL (US)

( * ) Notice: Subject to any disclaimer, the term of this patent is extended or adjusted under 35 U.S.C. 154(b) by 189 days.

(21) Appl. No.: 17/118,386

(22) Filed: Dec. 10, 2020

(65) Prior Publication Data
US 2021/0172042 A1    Jun. 10, 2021

Related U.S. Application Data

(60) Provisional application No. 62/946,078, filed on Dec. 10, 2019.

(51) Int. Cl.
*C22B 59/00* (2006.01)
*C22B 3/42* (2006.01)

(52) U.S. Cl.
CPC ............ *C22B 59/00* (2013.01); *C22B 3/42* (2013.01)

(58) Field of Classification Search
CPC .... C22B 3/00; C22B 3/04; C22B 3/06; C22B 3/08; C22B 3/10; C22B 59/00; C22B 3/42; C22B 3/20; C22B 3/22; C22B 3/24; C22B 7/006; C22B 7/007; C22B 7/02; C22B 7/04
See application file for complete search history.

(56) References Cited

U.S. PATENT DOCUMENTS

| | | | |
|---|---|---|---|
| 3,228,750 A | 1/1966 | Lindstrom et al. | |
| 7,244,403 B1 * | 7/2007 | Maloney | C01F 17/271 423/2 |
| 2014/0369907 A1 * | 12/2014 | Boudreault | C01B 13/18 423/132 |

OTHER PUBLICATIONS

Crock, J.G., Lichte, F.E. and Wildeman, T.R., 1984. The group separation of the rareearth elements and yttrium from geologic materials by cation-exchange chromatography. Chem. Geol., 45: 149-163. (Year: 1984).*
AG® 50W and AG MP-50 Cation Exchange Resins Instruction Manual, Oct. 12, 2013, BioRad (Year: 2013).*
Dowex 1X8-200, Oct. 10, 2021, Fischer Scientific (Year: 2021).*
DowexTM 1X8-200 formate form, 200-400 mesh, 2.5 kg, Aug. 6, 2014, Millipore Sigma (Year: 2016).*
Nuclide Safety Data Sheet Lutetium-177, Sep. 17, 2005, NCHPS (Year: 2005).*
J. C. Laul , K. K. Nielson and N. A. Wogman, Trace Rare Earth Analysis by Neutron Activation and Y-Ray/X-Ray Spectrometry, 1977, p. 198-204 (Year: 1977).*

(Continued)

*Primary Examiner* — Keith D. Hendricks
*Assistant Examiner* — Nikolas Takuya Pullen
(74) *Attorney, Agent, or Firm* — Gregory P. Einhorn; Greer, Burns & Crain, Ltd.

(57) ABSTRACT

In alternative embodiments, provided are processes and continuous ion exchange/continuous ion chromatography (CIX/CIC) systems for the separation of rare earth elements and non-rare earth elements, including metals, into individual high purity elements.

24 Claims, 13 Drawing Sheets

(56) References Cited

OTHER PUBLICATIONS

Lutes, Christopher et al. Integrated Ion Exchange Regeneration Process for Drinking Water, Apr. 2010, Environmental Security Technology Certification Program (Year: 2010).*
Dowex-50-X8, Jul. 3, 2012, Spectrum Laboratory Products (Year: 2012).*
D. L. Massart, Cation-Exchange Techniques in Radiochemistry, Dec. 1971, Pharmaceutical Institute Vrije Universiteit Brussel (Year: 1971).*
AG® 1, AG MP-1 and AG 2 Strong Anion Exchange Resin Instruction Manual, Jul. 1, 2013, Bio Rad (Year: 2013).*
Shabbir, Saira & Rhee, Hakjune. (2015). Pd Nanoparticles Supported on Anion Exchange Resin and its Application to Hydrodechlorination of PCBs. (Year: 2015).*
Verbaan, N., Bradley, K., Brown, J., and Mackie, S., 2015. A review of hydrometallurgical flowsheets considered in current REE projects. Nov. 13-14, 2015, Victoria, British Columbia. British Columbia Ministry (Year: 2015).*
Ang et al., "The effectiveness of ion exchange resins in separating uranium and thorium from rare earth elements in acidic aqueous sulfate media. Part 1. Anionic and cationic resins" Hydrometallurgy, 2017, v 174, p. 147-155.
Cameron et al., "Solubility of calcium sulphate in aqueous solutions of sulphuric acid" Jour. Prakt. Cham, 1884, v 29, n 62, p. 571-577.
Ochsentihn-Petropulu et al., "Selective separation and determination of scandium from yttrium and lanthanides in red mud by a combined ion exchange/solvent extraction method" Analytica Chimica Acta, 1995, v 315, p. 231-237.
Tsakanika et al., "Investigation of the separation of scandium and rare earth elements from red mud by use of reversed-phase HPLC" Anal Bioanal Chem, 2004, v 379, p. 796-802.
Arden et al., "Recovery of Thorium From Sulphate Solutions By Anion Exchange" J. Appl. Chem. 1959, p. 406-409.
Bachman et al., "Thorium" Analysis of Essential Nuclear Reactor Materials, p. 293-348, Jan. 1, 1964.
Ishida et al., "Thin-layer chromatographic behaviour and separation of rare earths on silica gel in aqueous ammonium sulfate solution" Fresenius Z Anal Chem, 1987, v 328, p. 228-231.
Ishida et al., "Thin-layer chromatographic behaviour and separation of rare earths in silica gel-aqueous alkali metal chloride systems" Fresenius J Anal Chem, 1990, v 336, p. 419-422.
Ridley, "Gradient ion chromatographic determination of rare earth elements in coal and fly ash" Department of Geology, University of Cape Town, Mar. 1992.
Gladrow, "The separation of the rare earths by ion exchange" (1948). Retrospective Theses and Dissertations. 12732.
Spedding et al., "The Separation of Rare Earths by Ion Exchange" The Institute for Atomic Research and from the Department of Chemistry, Iowa State College, 1947, v 69, p. 2777-2781.
Ninomiya et al., "Thin-layer chromatographic behaviour and separation of rare earths in silica gel-aqueous alkali metal nitrate systems" Fresenius Z Anal Chem, 1988, v 332, p. 798-801.
Verma et al., "High-Performance Liquid and Ion Chromatography: Separation and Quantification Analytical Techniques for Rare Earth Elements" Geostandards and Geoanalytical Research, 2007, v 31, n 3, p. 161-184.

Nagle et al., "An Ion-exchange Method for the Separation of Thorium from Rare Earths, and its Application to Monazite Analysis" Separation of Thorium From Rare Earths, 1959, v v 84, p. 37-41.
Nash et al., "Analytical Separations of The Lanthanides: Basic Chemistry and Methods*" Handbook on the Physics and Chemistry of Rare Earths, 2000, v 28, p. 311-371.
Cullivan et al., "Economic and Chemical Comparisons of Hydrochloric Acid Recovery Technologies for Iron Pickling Operations" Beta Control Systems, Inc., p. 1-12, Mar. 2016.
Moraes et al., "Dynamic ion-exchange chromatography for the determination of lanthanides in rock standards" Journal of Chromatography, 1994, v 679, p. 387-391.
Bruzzoniti et al., "Determination of rare earth elements by ion chromatography. Separation procedure optimization" Analytica Chimica Acta, 1996, v 322, p. 49-54.
Strelow et al., "Determination of Trace and Ultra-Trace Quantities of Rare-Earth Elements by Ion Exchange Chromatography-Mass Spectrography" Analytical Chemistry, 1974, v 46, n 11, p. 1481-1486.
Watkins et al., "Determination of rare-earth elements in coal using microwave digestion and gradient ion chromatography" Chemical Geology, 1995, v 121, p. 273-283.
Udall, "Chemistry of Iron in Natural Water" Geological Survey Water-Supply Paper 1459, 1962.
Ochsenkuhn-Petropoulo et al., "Pilot-Plant Investigation of the Leaching Process for the Recovery of Scandium from Red Mud" Ind. Eng. Chem. Res, 2002, v 41, p. 5794-5801.
Ang et al., "The effectiveness of ion exchange resins in separating uranium and thorium from rare earth elements in acidic aqueous sulfate media. Part 2. Chelating resins" Minerals Engineering, 2018, v 123, p. 8-15.
Kuroda et al., "Ion-Exchange Chromatography of Glycolatocomplexes of Rare Earths" Chromatographia, 1991, v 32, n 1/2, p. 65-68.
Chen et al., "Chromatographic Techniques for Rare Earth Elements Analysis" Physical Sciences Reviews, 2017, p. 1-35.
Adachi et al., "Reversed-Phase Chromatographic Separation of the Rare Earth Elements" Chromatographia, 1990, v 29, n 11/12, p. 579-582.
Kifle et al., "Selective liquid chromatographic separation of yttrium from heavier rare earth elements using acetic acid as a novel eluent" Journal of Chromatography A, 2013, v 1307, p. 86-90.
Kuroda et al., "Reversed-phase thin-layer chromatography of rare earth elements on C18 bonded silica" Analytical Sciences, 1988, v 4, p. 667-669.
Naik et al., "Separation of rare earths by reverse phase partition chromatography" J Radioanal Nucl Chem, 2017, v 311, p. 237-241.
Kuroda et al., "Reversed-Phase Thin-Layer Chromatography of the Rare Earth Elements" Chromatographia, 1988, v 25, n 11, p. 989-992.
Merroune, A., et al., "A comprehensive review on solvent extraction technologies of rare earth elements from different acidic media: Current challenges and future perspectives," J Industrial & Engineering Chem., published online Apr. 26, 2024, 17 pages.
Sutterlin, R., "Recovery of Rare Earth Elements From Coal Mining Waste Materials," Federal Grant Final Report to Department of Energy (DOE), Submission Date Aug. 28, 2019, 41 pages.

\* cited by examiner

CIX/CIC Unit Operation to Isolate REE's and other Metals of Interest

Small Element Bench Test Configuration

PROCESSES FOR THE SEPARATION OF RARE EARTH ELEMENTS AND NON-RARE EARTH ELEMENTS INTO INDIVIDUAL HIGH PURITY ELEMENTS

RELATED APPLICATIONS

This U.S. Utility patent application claims the benefit of priority under 35 U.S.C. § 119(e) of U.S. Provisional Application Ser. No. 62/946,078 filed Dec. 10, 2019. The aforementioned application is expressly incorporated herein by reference in its entirety and for all purposes.

TECHNICAL FIELD

This invention generally relates to industrial rare earth recovery. In alternative embodiments, provided are processes and continuous ion exchange/continuous ion chromatography (CIX/CIC) systems for the separation of rare earth elements and non-rare earth elements, including metals, into individual high purity elements.

BACKGROUND

Current methods used to purify the rare earth elements from natural sources produce massive quantities of waste. Purifying one ton of a rare earth element creates tons of acidic and radioactive waste. The processes are also energy intensive. Clearly improved methods for separating and isolating rare earth elements are needed.

The rare earths tend to behave chemically in a similar manner, so that separation of the individual elements by conventional chemical methods such as fractional crystallization is very difficult. The approximately 200 year time span needed to identify all of them highlights the difficulty involved in the separation of these elements from each other using chemical methods.

SUMMARY

In alternative embodiments, provided are processes for the separation of rare earth elements and non-rare earth elements, including metals, into individual high purity elements, comprising a process as set forth in FIG. 1 and/or FIG. 2, and as described herein.

In alternative embodiments, provided are systems, for example, multiplexed systems including pluralities of chromatography columns, for the separation of rare earth elements and non-rare earth elements, including metals, into individual high purity elements, comprising a process as set forth in FIG. 1 and/or FIG. 2, and as described herein.

In alternative embodiments, provided are continuous ion exchange/continuous ion chromatography (CIX/CIC) systems for the separation of rare earth elements and non-rare earth elements, including metals, into individual high purity elements, comprising a process as set forth in FIG. 1 and/or FIG. 2.

In alternative embodiments, provided are processes for the separation of rare earth elements (REE) and non-rare earth elements into individual high purity elements, comprising:

(a) providing a starting material comprising at least one rare earth element (REE) and at least one non-rare earth elements;

(b) mixing the starting material in an acid or acid chloride solution, or adding the starting material to an acid or acid chloride solution, wherein the acid or acid chloride solution has greater than about 1 molarity chloride concentration, or between about 0.01 molarity and 10 molarity chloride concentration;

(c) adding or loading the starting material-comprising acid or acid chloride solution of step (b) into or onto an anion exchange resin column, whereby any ferric tetrachloride anion (optionally a $FeCl_4^{-1}$ complex binds to the anion exchange resin) in the starting material-comprising acid chloride solution is retained on the anion exchange resin, and generating a ferric tetrachloride ($FeCl_4^{-1}$ complex) anion-free, cationic metal-comprising eluate, and optionally any zinc, thorium and/or uranium in the starting material-comprising acid chloride solution is also retained on the anion exchange resin;

(d) adding or loading the ferric tetrachloride anion-free, cationic metal-comprising eluate of (c) into or onto a cationic exchange resin column, whereby REEs are retained on the cationic exchange resin;

(e) passing low to high gradient acid eluting solutions over or through the cationic exchange resin column, wherein the passing comprises:

(i) first passing an eluting solution having a low acid concentration of about 0.1 to 1 molarity, followed by an eluting solution of about 1 to 2 molarity, followed by an eluting solution of about 3 to 10 or more molarity, or (ii) passing an eluting solution over or through the cationic exchange resin column that changes over time from about 0.1 to 1 molarity, to about 1 to 2 molarity, to about 3 to 10 or more molarity, and at low acid concentration of about 1 molarity or less, a majority of or greater than 50%, or at least about 50%, 60%, 70%, 80%, 85%, 90% or 95%, of monovalent and/or divalent cations are eluted off the cationic exchange resin column, and at acid concentrations of between about 1 to 2 molarity, a majority of or greater than 50%, or at least about 50%, 60%, 70%, 80%, 85%, 90% or 95%, of trivalent cations (optionally aluminum cations) elute off the cationic exchange resin column, and at acid concentrations greater than about 3 or more molarity, a majority of or greater than 50%, or at least about 50%, 60%, 70%, 80%, 85%, 90% or 95%, of the REEs elute off the cationic exchange resin column; and (f) collecting the eluted REEs.

In alternative embodiments, of processes as provided herein:

the at least one REE comprises lanthanum (La); cerium (Ce); praseodymium (Pr); neodymium (Nd); samarium (Sm); europium (Eu); gadolinium (Gd); terbium (Tb); dysprosium (Dy); holmium (Ho); erbium (Er); thulium (Tm); ytterbium (Yb); lutetium (Lu); yttrium (Y), scandium (Sc) or any combination thereof;

the non-rare earth elements comprise metals or metal oxides, and optionally the metals comprise iron or iron oxides, or aluminum or aluminum oxides (aluminum (Al) does not always separate easily from the REEs, but it can be done with multiple passes, it is not necessary that Al is 100% removed, and small amounts can be separated in further downstream processes);

the starting material comprises a mining waste, an acid mine drainage (AMD), an acid rock drainage (ARD), an acid or metalliferous drainage, AMD sludge, a coal overburden, a fire clay, a fly ash, an ore or any combination thereof;

the acid chloride solution comprises: hydrochloric acid or sulfuric acid combined with a chloride salt, and optionally the chloride salt comprises sodium chloride;

the anion exchange resin comprises a polymeric matrix to which functional groups are attached, and optionally the functional groups comprise: tertiary amino groups; primary amines; secondary amines; quaternary ammonium groups or a combination thereof;

and optionally the polymeric matrix comprises: $N^+(CH_3)_3$ groups (type 1 resins); $—N^+(CH_3)_2C_2H_4OH$ groups (type 2 resins); or, a combination thereof;

and optionally the polymeric matrix comprises styrene-divinylbenzene;

the anion exchange resin is regenerated by eluting off the ferric tetrachloride anion, and any zinc, thorium and/or uranium if present, by passing a water solution over or through the anion exchange resin, and the water dilutes the $FeCl_4^{-1}$ to form $FeCl_3$ which is not anionic and therefore not attracted to the anion exchange resin, and optionally collecting and recycling the elution solution, wherein optionally the elution solution comprises an $FeCl_3$ solution, and if present, the zinc, thorium and/or uranium;

the low to high gradient acid eluting solutions comprise hydrochloric acid or sulfuric acid; and/or the cationic exchange resin comprises crosslinked polystyrene, divinylbenzene or a combination thereof, or comprises sulfonic acid groups, carboxylic acid groups or a combination thereof.

In alternative embodiments, provided are continuous ion chromatography (CIC) processes for the separation of rare earth elements (REE) and non-rare earth elements into individual high purity elements, comprising:

(a) providing a starting material comprising at least one rare earth element (REE) and at least one non-rare earth elements;

(b) mixing the starting material in an acid or acid chloride solution, or adding the starting material to an acid or acid chloride solution, wherein the acid or acid chloride solution has greater than about 1 molarity chloride concentration, or between about 0.1 molarity and 10 molarity chloride concentration;

(c) adding or loading the starting material-comprising acid or acid chloride solution of step (b) into or onto a continuous ion chromatography (CIC) column comprising a strong cation (optionally Dowex 650C™ or Purolite SSTC60™ or equivalents) or strong anion (optionally Dowex 1™, Amberlite HPR550 OH™) resin, whereby the REEs are retained on the CIC column;

(d) adding to or passing through the CIC column of (c) an eluting solution comprising a chelating material, thereby eluting the REEs off the CIC column; and (f) collecting the eluted REEs.

In alternative embodiments of the CIC processes:

the chelating material comprises: ethylenediamine, ethylenediaminetetraacetic acid (EDTA), lactic acid, glycolic acid, citric acid, acetic acid, ascorbic acid, and/or a sodium, a potassium or an ammonium salt thereof;

the at least one REE comprises lanthanum (La); cerium (Ce); praseodymium (Pr); neodymium (Nd); samarium (Sm); europium (Eu); gadolinium (Gd); terbium (Tb); dysprosium (Dy); holmium (Ho); erbium (Er); thulium (Tm); ytterbium (Yb); lutetium (Lu); yttrium (Y), scandium (Sc) or any combination thereof;

the starting material comprises a mining waste, an acid mine drainage (AMD), an acid rock drainage (ARD), an acid or metalliferous drainage, AMD sludge, a coal overburden, a fire clay, a fly ash, an ore or any combination thereof;

the eluted solution comprising the at least one REE comprises a minimum of 300 ppm REE and less than three times the REE concentration of non-REEs into multiple fractions of similar molecular mass REEs, or light, mid and heavy REE fractions;

In alternative embodiments, provided are continuous ion exchange/continuous ion chromatography (CIX/CIC) systems configured to practice methods as provided herein.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference in their entireties for all purposes.

DESCRIPTION OF DRAWINGS

The drawings set forth herein are illustrative of exemplary embodiments provided herein and are not meant to limit the scope of the invention as encompassed by the claims.

Like reference symbols in the various drawings indicate like elements.

DETAILED DESCRIPTION

Figure 1:
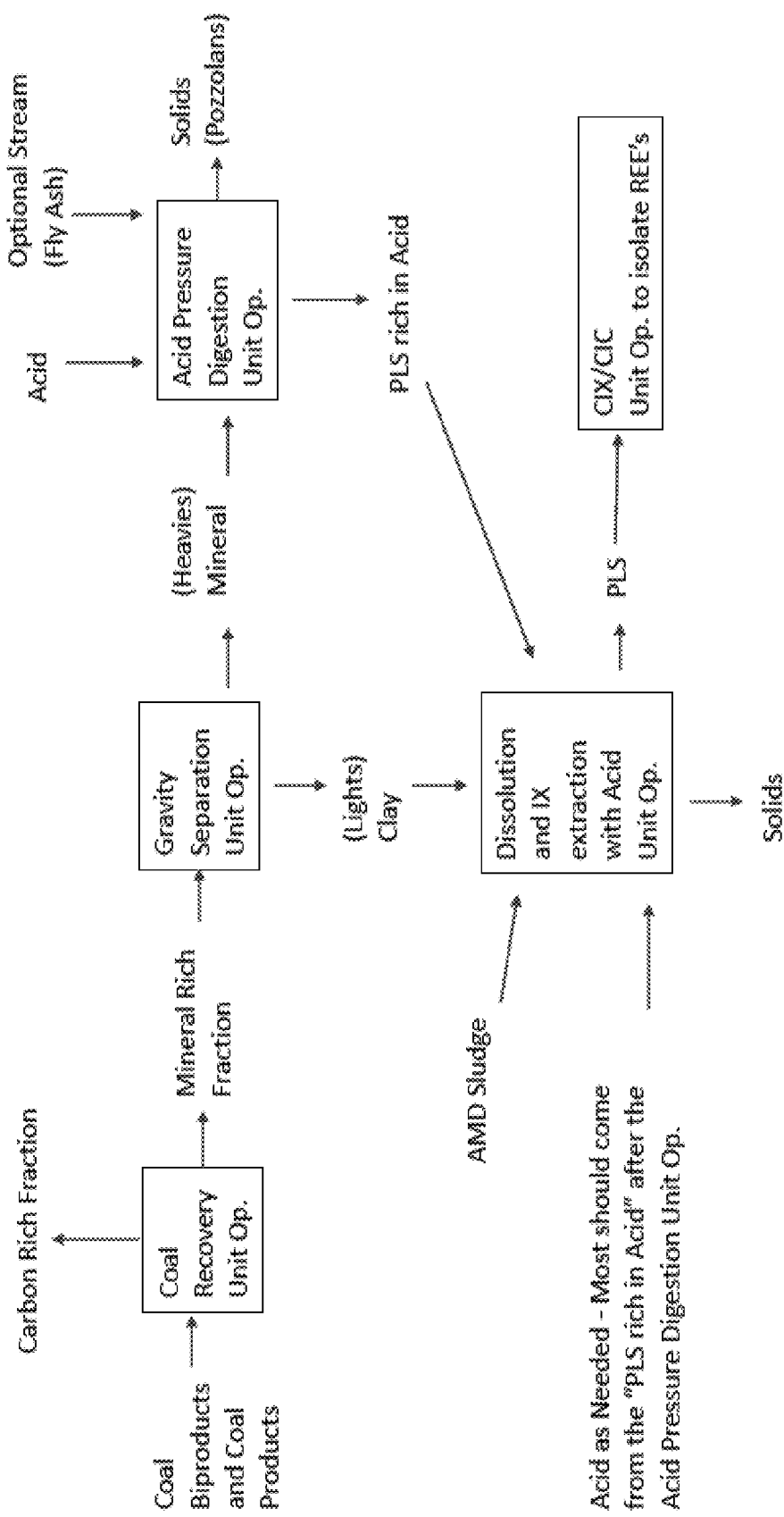
FIG. 1 illustrates an exemplary process for isolating REEs and metals as provided herein.

In alternative embodiments, provided are processes for the separation of rare earth elements and non-rare earth elements, including metals, into individual high purity elements.

In alternative embodiments, processes as provided herein comprise use of any rare earth element-comprising material as a starting material; for example, a starting material for a process as provided herein can comprise a mining waste such as an acid mine drainage, or acid and metalliferous drainage, (AMD) sludge, a coal overburden, a fire clay, a fly ash, an ore or similar materials or any combination thereof.

In alternative embodiments, processes as provided herein are used to separate and isolate rare earth elements (REEs), or the "rare earths", which can comprise a group of 14 elements, lanthanum (La); cerium (Ce); praseodymium (Pr); neodymium (Nd); samarium (Sm); europium (Eu); gadolinium (Gd); terbium (Tb); dysprosium (Dy); holmium (Ho); erbium (Er); thulium (Tm); ytterbium (Yb); lutetium (Lu); with similar size (atomic radius) and chemical properties. This group of chemically similar elements is called the lanthanide series by chemists and is classified by their atomic weights. Yttrium (Y) and scandium (Sc) are also usually included in the rare earth classification due to somewhat similar chemical processing responses. For the purposes of this application Sc and Y are included as REEs.

In alternative embodiments, processes as provided herein comprise use of one platform technology to extract and purify various feedstocks, where in alternative embodiments only using one platform technology can have the advantages of:
1. The procedure does not require heat or excessive energy.
2. The procedure is able to recycle and recover the majority of the acids.
3. The procedure provides for the efficient recovery of iron as ferric chloride.
4. It does not use large amounts of toxic solvents.
5. The footprint of this technology is significantly smaller than competitive REE purification procedures.
6. The process is continuous.
7. The process does not use exotic equipment
8. The process yields high purity REE's and other metals of interest.

In alternative embodiment, processes as provided herein comprise:

Stage 1: Anion Exchange Resin to Remove Iron, Zinc, Thorium and Uranium.

In alternative embodiments, processes as provided herein subject a starting rare earth element-comprising material to an acid leaching producing a pregnated leach solution (PLS). In alternative embodiments, the acid comprises sulfuric acid, nitric acid hydrochloric acid (HCl acid) or various organic acids or mixtures thereof. In some aspects, HCl acid may be desirable because it produces chloride salts and can be recycled. Using HCl allows for easy removal of the highest contaminating metal, iron. When iron reacts with HCl in the presence of high chlorides it creates the anion complex $FeCl_4^{-1}$. This $FeCl_4^{-1}$ complex will bind with an anion exchange resin. Greater than 99.8% of the iron can be removed with this technique. Once the $FeCl_4^{-1}$ complex is bound to the anion exchange resin it can be released easily by just passing water over it. This water dilutes the $FeCl_4^{-1}$ to form $FeCl_3$ which is not anionic and therefore not attracted to the anion exchange resin. The $FeCl_3$ solution can be recycled, as it is a popular water flocculating agent used all over the world for water purification.

A similar anionic chloride complex occurs with zinc and the actinides thorium and uranium. Therefore, they will come out of the anion exchange resin at this stage too. This solution can later be further oxidized with air bubbling to ensure that these actinides are in their fully oxidized stated. Thorium has an oxidation state of +4 and uranium will be at +4, +5, +6. The iron is at +3 and Zn at +2. These different oxidations states and the tendency of larger atoms to have higher affinities on IX resins enables the separation of iron and zinc from solution.

Stage 2: Cation Chromatographic Resin (CIC)

In alternative embodiments, for the next stage, processes as provided herein comprise removing the cation exchange resin and replacing it with a chromatographic resin. This allows for tighter separations. In this section the goal is to generate a light, mid, and heavy cut. This section also removes any other non-REEs that are present.

In alternative embodiments, the cation exchange resin is not removed. In alternative embodiments, processes and systems as provided herein comprise use of multiple columns, e.g., cation exchange resin comprising columns, where each column has its own dedicated resin (which need not ever be removed from that column).

Stage 3: Batch Chromatography Column or a Flash Chromatography Column

As an example, at this stage our volume and masses have become too small to run on the continuous system. Therefore, for the next stage, processes as provided herein comprise use of a batch chromatography column or a flash chromatography column. This column was packed with a stationary phase and eluted with a chelating agent in the mobile phase.

Multipurpose Facilities

Figure 2:
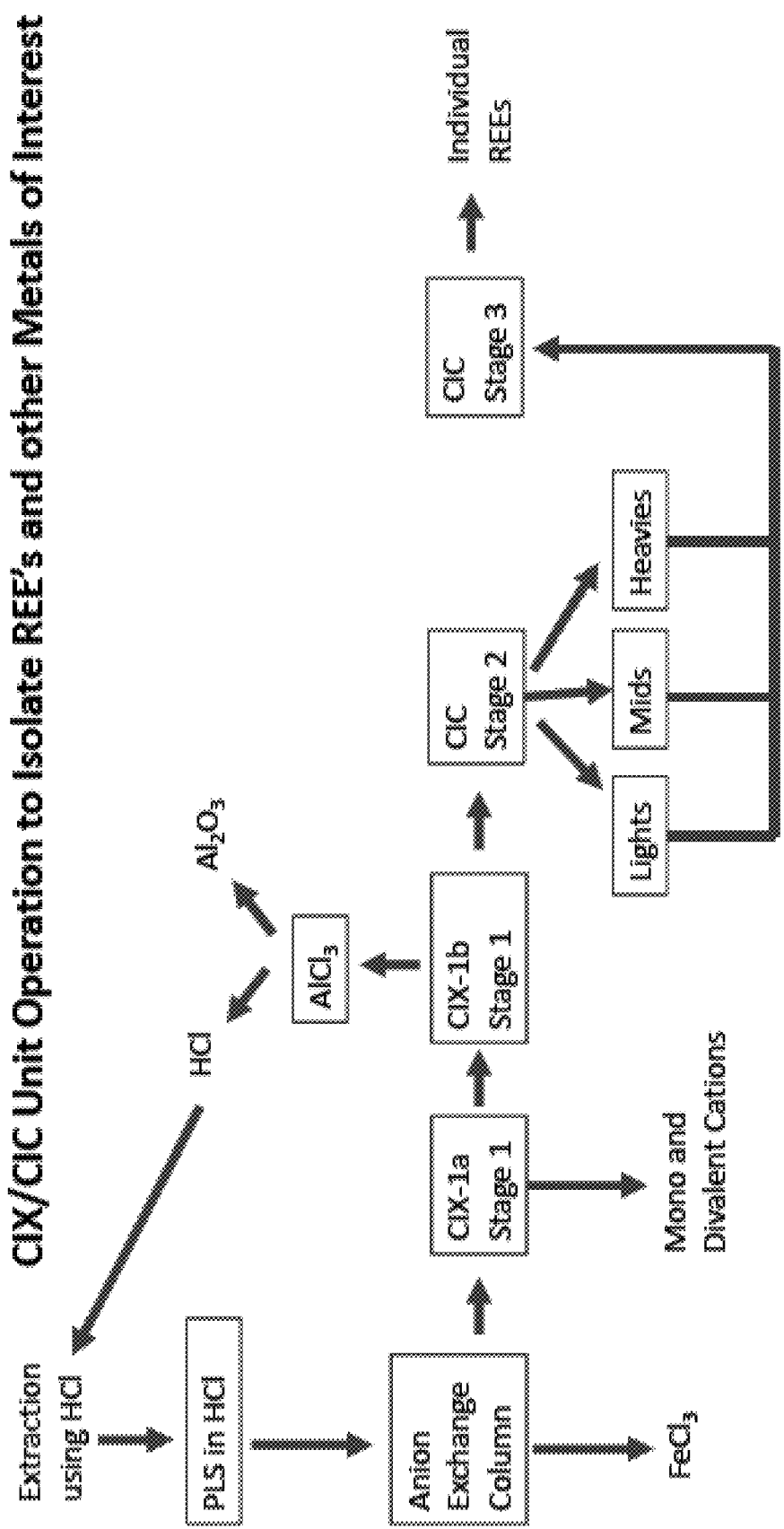
FIG. 2 illustrates an exemplary process, an exemplary continuous ion exchange/continuous ion chromatography (CIX/CIC) system, for isolating REEs and metals as provided herein.

In alternative embodiments, provided are multi-purpose facilities as schematically illustrated in FIG. 1 and FIG. 2.

In alternative embodiments, processes as provided herein comprise use of multipurpose facilities that can process all coal biproducts.

In alternative embodiments, these include:
1. clays that can easily be leached with ion exchange or acid;
2. Hard mineral deposits that can be leached with high pressure acid digestion;
3. Fly ash can be leached in the high pressure acid digestion reactor.
4. Acid mine drainage, or acid and metalliferous drainage, (AMD) sludge is a high source of REE's and can easily be dissolved to form a pregnant leach solution.

In alternative embodiments, processes as provided herein comprise the recycling of acids.

FIG. 1 schematically illustrates an exemplary process and facility as provided herein that can handle, for example, coal overburden, AMD sludge and fly ash. This part of the process can extract the REE's from the matrix. The result leaving this part of the system is an REE containing pregnated leach solution (PLS) that can now be separated. Not shown are acid recycling streams that make this process more efficient.

FIG. 2 schematically illustrates an exemplary process comprising use of a CIX/CIC separation system and a separation design. This exemplary process comprises having the pregnated leach solution (PLS) coming into the CIX/CIC separation system. This exemplary design can handle any PLS. There is no need for special designs for specific feedstocks. The first step is iron removal on the continuous anion exchange unit.

The next step (Stage 1) comprises use of a continuous ion exchange to remove non-REE from the REE's. The enriched REE fraction is again processed to enrich it further.

Aluminum is a valuable product that can be produced in this process. It will elute as aluminum chloride. In alternative embodiments, this is converted to alumina and HCl.

The enriched REE fraction can then be separated into fractions of light, mid and heavy REE fractions (Stage 2). Each fraction can then campaigned to isolate individual REE's. (Stage 3).

Hydrometallurgy

We have conducted several tests with pressurized acid leaching systems. We have restricted ourselves to using only HCl, $HNO_3$ and $H_2SO_4$. So far, the results for acid leaching on mineralized rock follow this pattern:

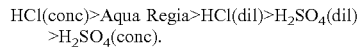

HCl(conc)>Aqua Regia>HCl(dil)>$H_2SO_4$(dil) >$H_2SO_4$(conc).

Bench Scale Separation Testing.

Figure 3:
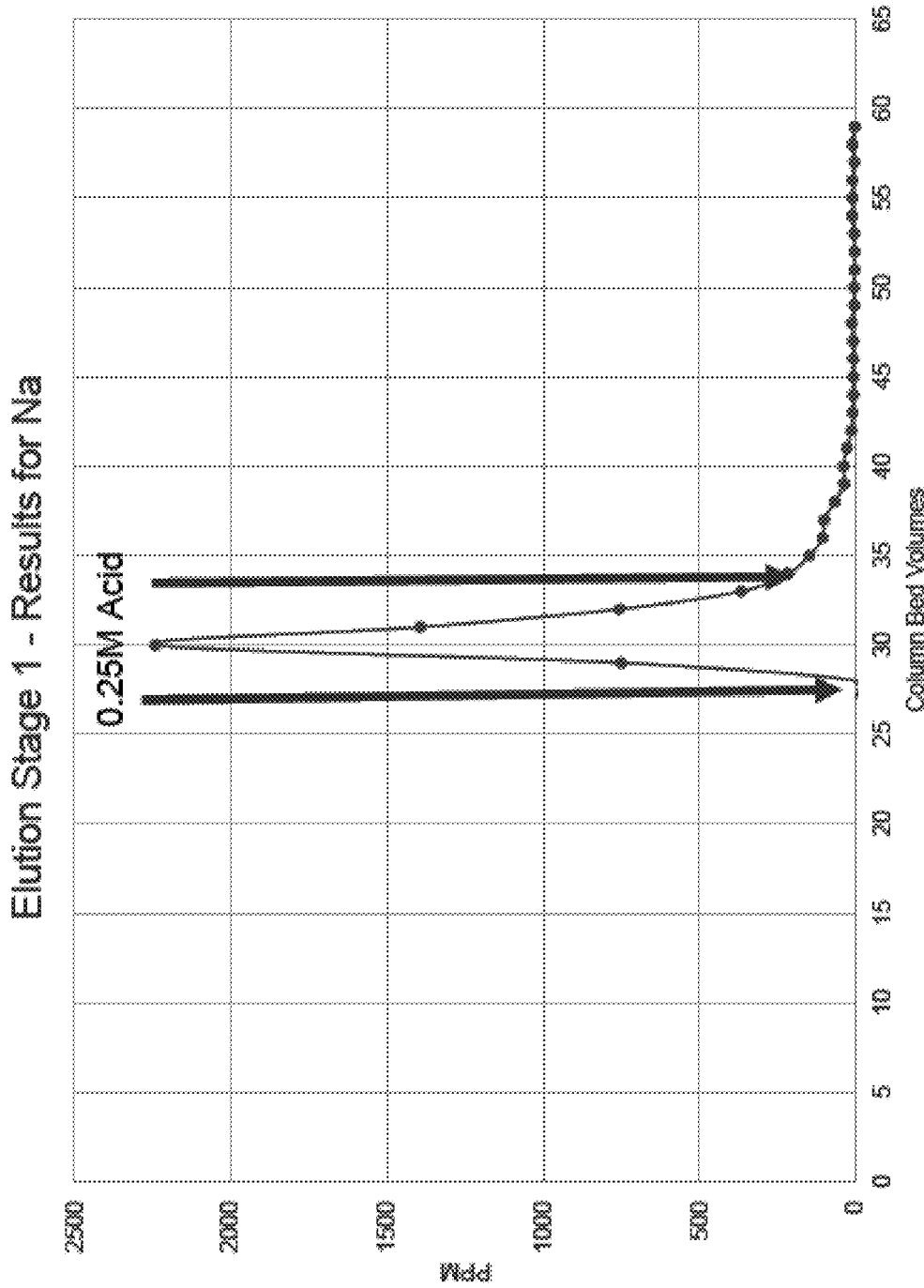
FIG. 3 graphically illustrates an elution stage of an exemplary continuous ion exchange/continuous ion chromatography (CIX/CIC) system for sodium (Na) using 0.25 M acid, as discussed in detail, below.
Figure 4:
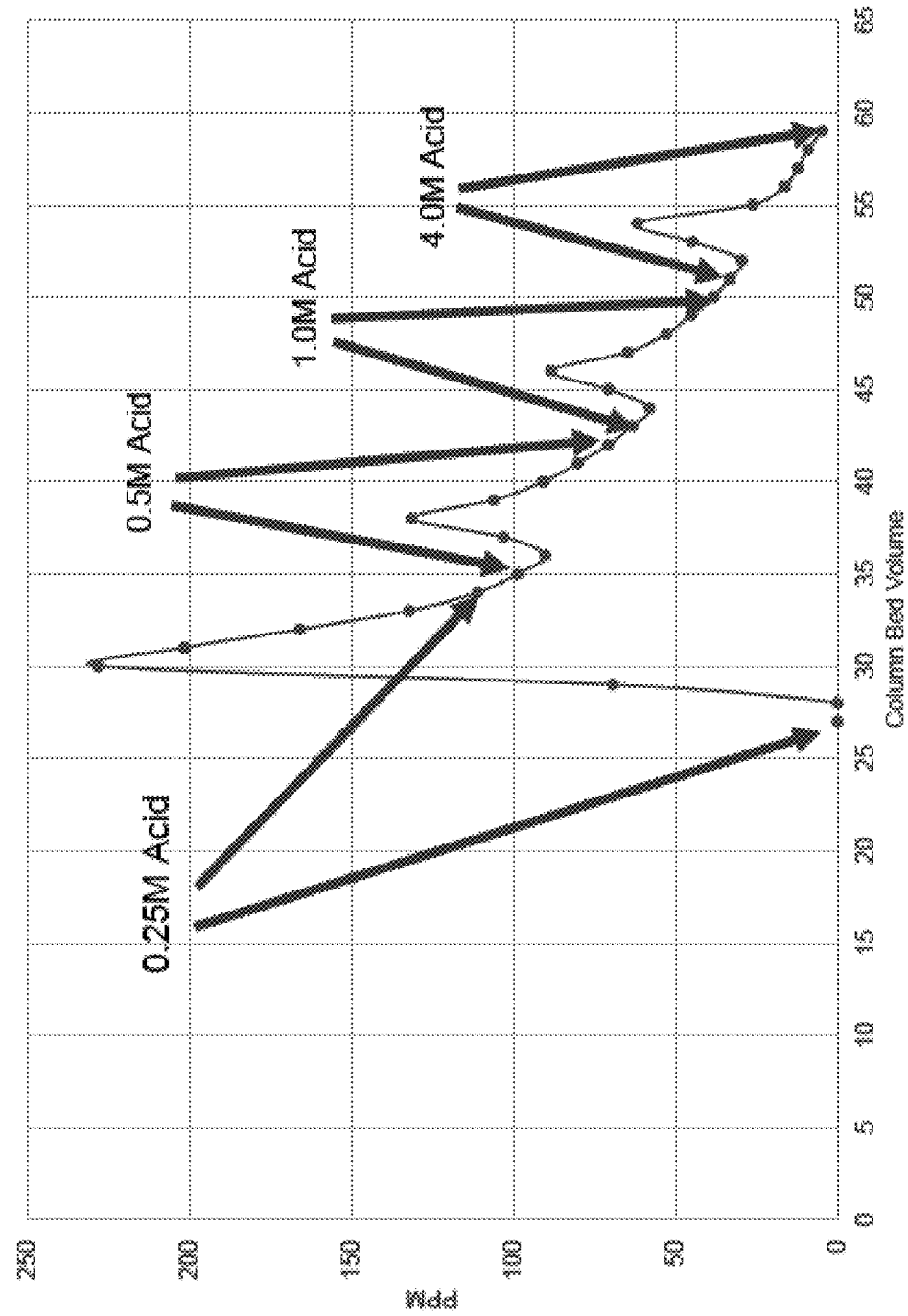
FIG. 4 illustrates graphically illustrates an elution stage of an exemplary continuous ion exchange/continuous ion chromatography (CIX/CIC) system for magnesium (Mg) using 0.25 M acid, as discussed in detail, below.
Figure 5:
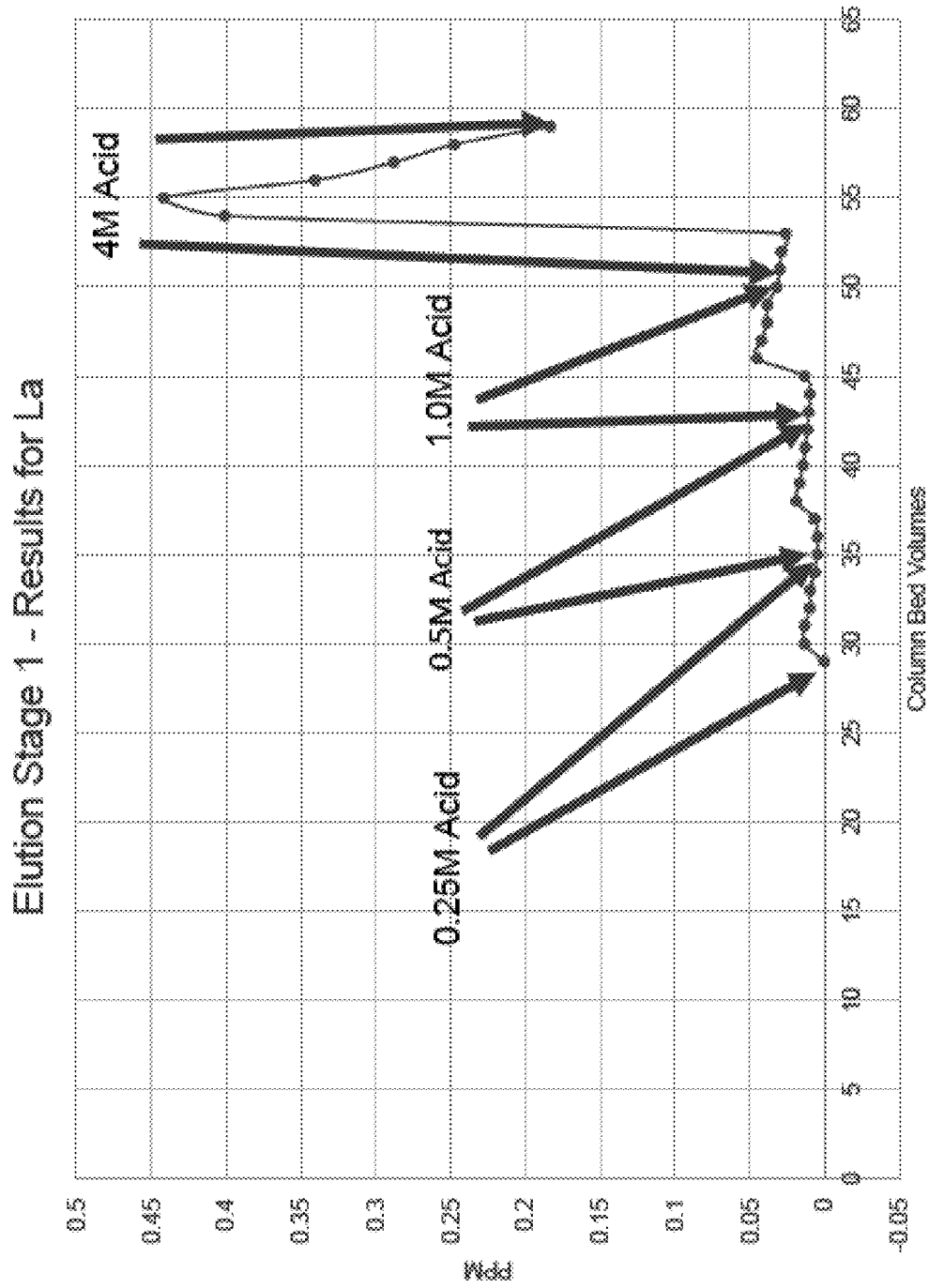
FIG. 5 illustrates graphically illustrates an elution stage of an exemplary continuous ion exchange/continuous ion chromatography (CIX/CIC) system for lanthanum (La) using 0.25 M acid, as discussed in detail, below.

The data graphically illustrated in FIG. 3, FIG. 4, FIG. 5, was obtained from a single column, not continuous. This is the Stage 1 IX separation conducted on AMD sludge from Pennsylvania. The goal of this stage 1 is to separate the non-REE's from the REE's. For simplicity of this report we chose to present a monovalent (sodium), divalent (magnesium) and trivalent REE (lanthanum) cations. All other cations exhibited a similar valence number performance. For brevity reasons we are only presenting 1 plot of each valence and not the whole Cation analysis conducted.

The data graphically illustrated in FIG. 3 is for sodium; it is monovalent; all the monovalent cations exhibited a similar graph, and the majority of the monovalent cations elute with a low 0.25M solution of acid.

The data graphically illustrated in FIG. 4 is for magnesium. It is divalent. All the divalent cations exhibited a similar graph. The majority of the divalent cations elute with an acid concentration of 1.0M or less.

The data graphically illustrated in FIG. 5 is for Lanthanum. It is a trivalent REE. All the trivalent REE cations exhibited a similar graph. Unlike the other non-REE cations, the majority of the trivalent REE cations do not elute with acid concentrations at 1.0 M or less. These large trivalent cations have a higher affinity for the IX resin and require a higher acid strength to elute them.

Hydrometallurgy

In alternative embodiments for processes as provided herein, HCl is the acid of choice. One of the advantages of using HCl is it allows for easy removal of the highest contaminating metal, iron. When iron reacts with HCl in the presence of high chlorides it creates the anion complex $FeCl_4^{-1}$. This $FeCl_4^{-1}$ complex will bind with an anion exchange resin. As shown in Table 1, below, greater than 99.8% of the iron is removed with this technique. Once the $FeCl_4^{-1}$ complex is bound to the anion exchange resin it can be released easily by just passing water over it. This water dilutes the $FeCl_4^{-1}$ to form $FeCl_3$ which is not anionic and therefore not attracted to the anion exchange resin. The $FeCl_3$ solution is a popular water flocculating agent used all over the world for water purification.

Figure 6:
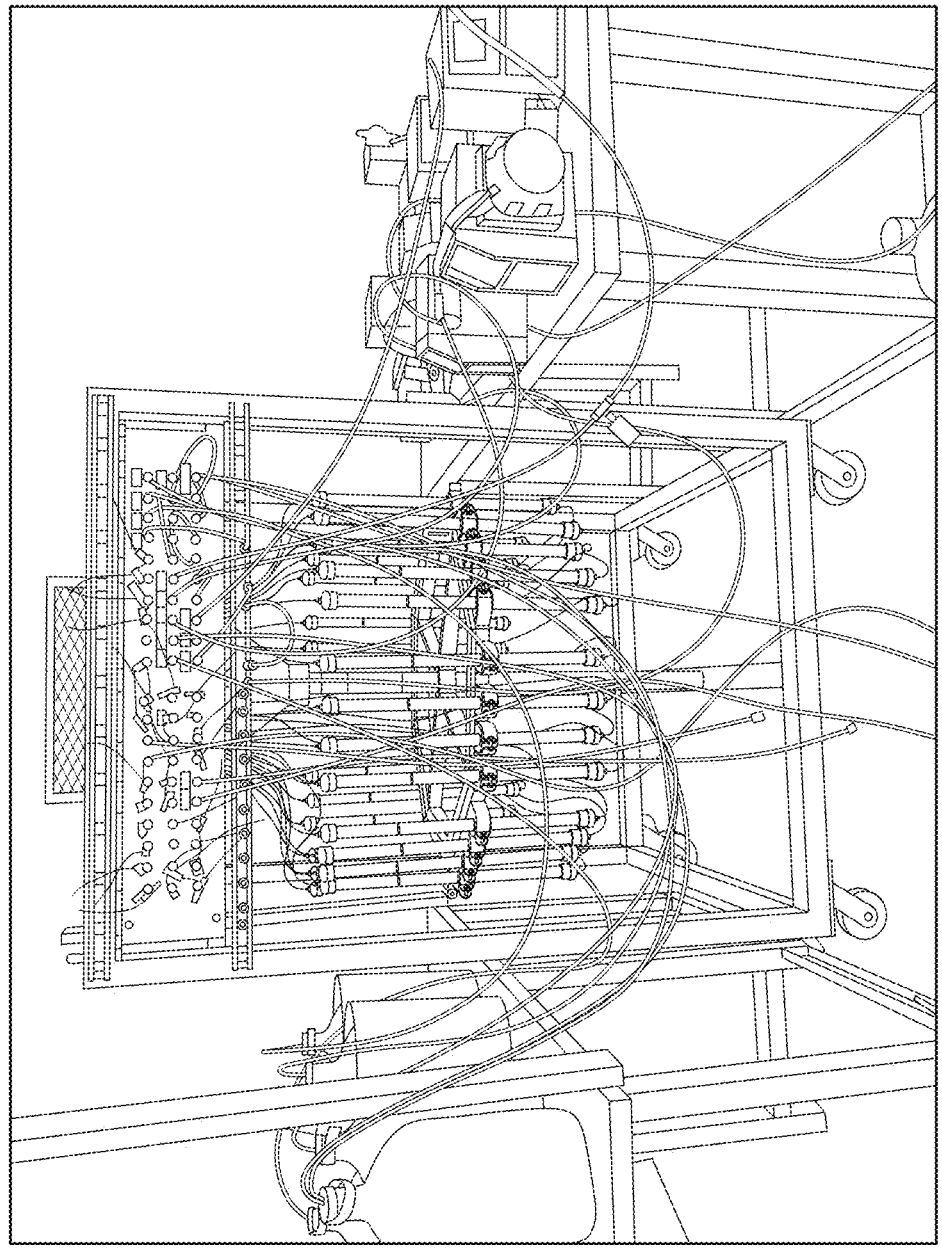
FIG. 6 illustrates an exemplary continuous ion exchange/continuous ion chromatography (CIX/CIC) system for isolating REEs and metals as provided herein.
Figure 7:
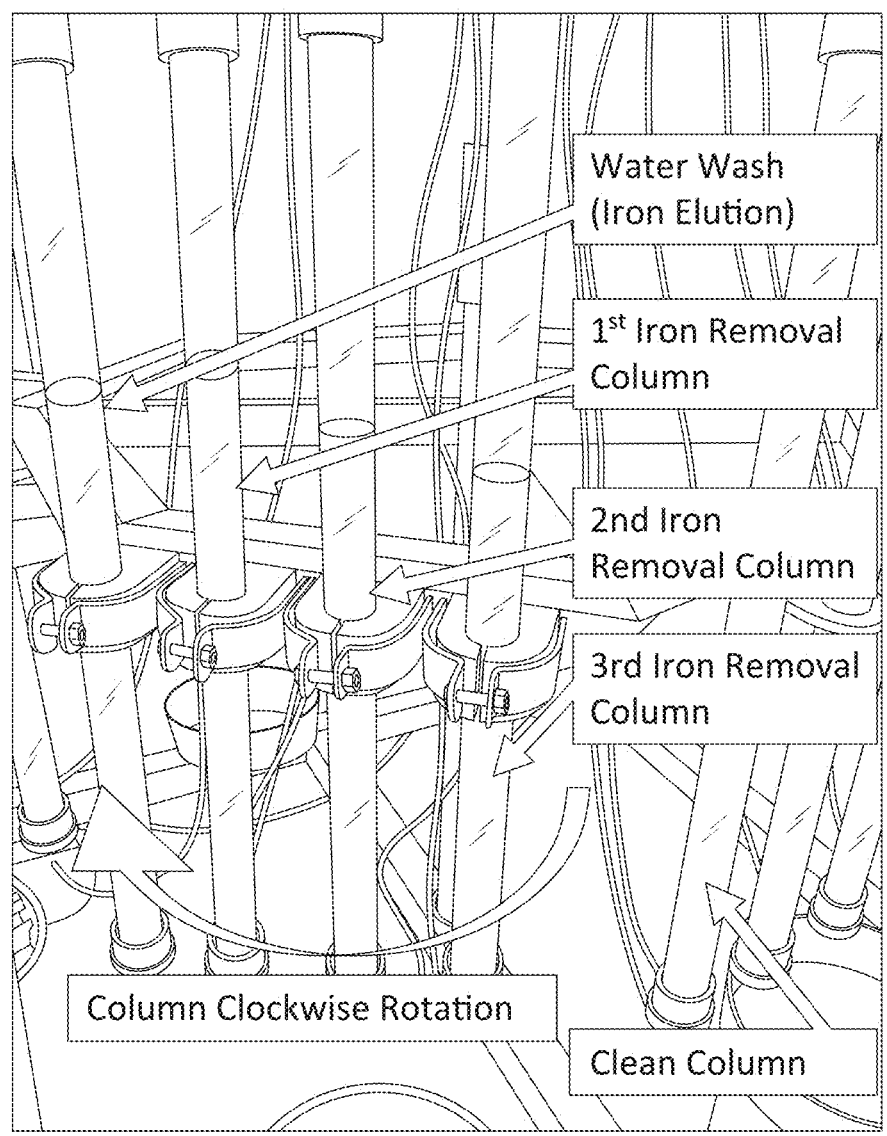
FIG. 7 illustrates an exemplary continuous ion exchange/continuous ion chromatography (CIX/CIC) system for isolating REEs and metals as provided herein.

In this embodiment, as illustrated in FIG. 6 and FIG. 7, the PLS solution enters the top of the 1$^{st}$ Iron Removal Column. It exits the bottom of the 1$^{st}$ column and enters the top of the 2$^{nd}$ Iron Removal Column. It exits the bottom of the 2$^{nd}$ column and enters the top of the 3$^{rd}$ Iron Removal Column. The solution that exits the bottom of the 3$^{rd}$ column is collected. After 5 minutes the columns are rotated so that column 3 becomes column 2 and column 2 becomes column 1 and column 1 goes to water washing. This is type of counter current loading. The column 1 has now been fully spent with iron loading and after the 5 minutes rotates to the water wash column that will release all of the absorbed iron.

As can be seen in the below table the iron content was reduced from an initial 1556.7 ppm to 3.6 ppm. A 99.8% reduction in iron. The iron has been concentrated and is fully released with the water washing. This counter current loading over 3 columns results in an iron solution coming out that is higher than the iron concentration entering in the FEED. Notice the green $FeCl_4^{-1}$ complex that results from it absorbing onto the resin. Notice the water washing column turns brown after the $FeCl_4^{-1}$ is washed off

TABLE 1

| Sample Name | Iron (ppm) | REE (ppm) |
| --- | --- | --- |
| PLS CIX FEED | 1566.7 | 150.3 |
| PLS Solution exiting the Iron Removal Column | 3.6 | 126.6 |
| Iron Exiting the Iron Water Wash Column | 2412.0 | 19.9 |

Figure 8:
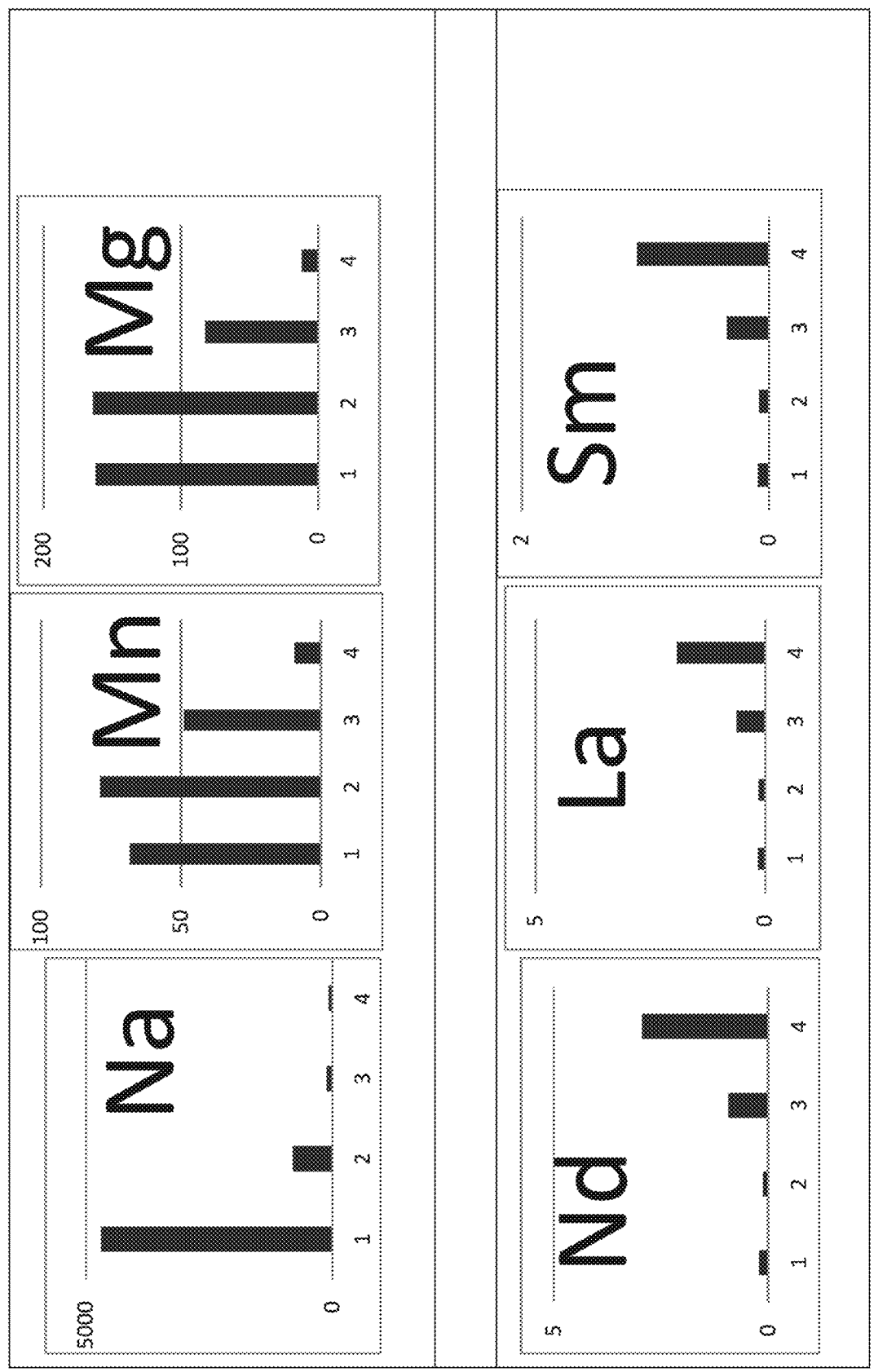
FIG. 8 illustrates mono and divalent metals found in pregnated leach solutions (PLS), as discussed in detail, below.

FIG. 8 top row illustrates some common mono and divalent metals found in the PLS. The bottom row shows some common REE's found in the PLS. Notice that the mono and divalent cations are found in our fractions 1, 2, and 3 but very little in fraction 4. The opposite is true for the REE's. They are found predominantly in fractions 3 and 4.

Stage 1 Separations.

As discussed above, exemplary CIX systems as provided herein comprise a continuous ion exchange process. In alternative embodiments, the first stage is the separation of the non-REEs from the REEs. This is accomplished because the REEs are relatively larger than most of the non-REEs and typically have higher oxidation states (+3) than the non-REEs. We have a schematic of the Stage 1 process. In this step all the elements stick onto the column. However, as the columns are rinsed with various concentrations of acids different elements come off. In alternative embodiments, monovalent elements such as sodium and potassium elute off the column with a 1M HCl solution. In alternative embodiments, divalent elements such as calcium and magnesium do not elute until a 2M HCl solution is passed over the columns. In alternative embodiments, the trivalent elements (REEs) are not eluted until a much higher concentrated acid is passed of the columns. Iron is also a trivalent, but, In alternative embodiments, it was removed in a prior anion exchange system. Aluminum is trivalent too, but it is much smaller than the REE atoms and, In alternative embodiments, elutes near the end of the 2 M HCl with the divalents.

Figure 9:
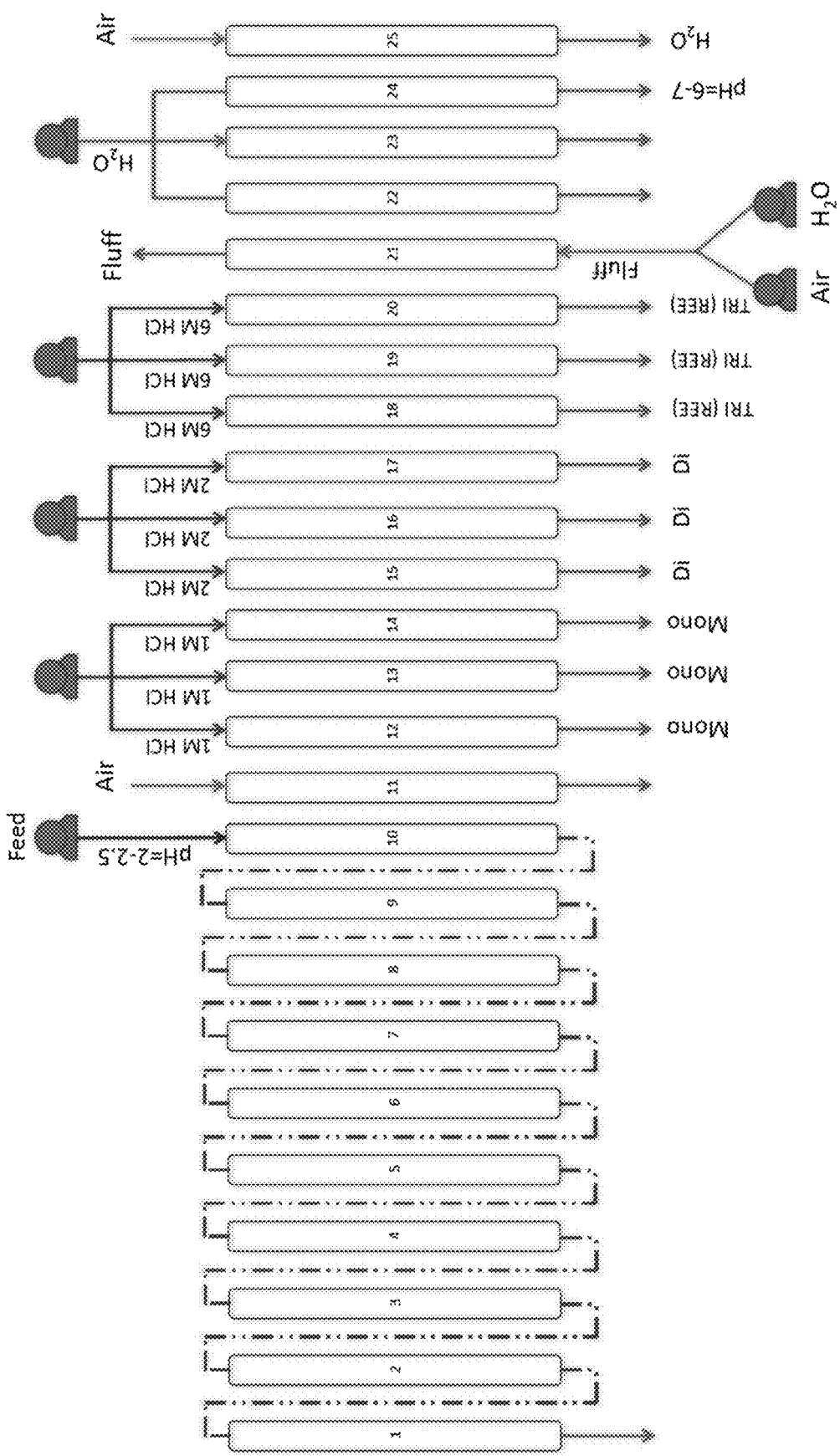
FIG. 9 schematically illustrates the elution order from an exemplary CIX Stage 1 system as provided herein, as discussed in detail, below.
Figure 10:
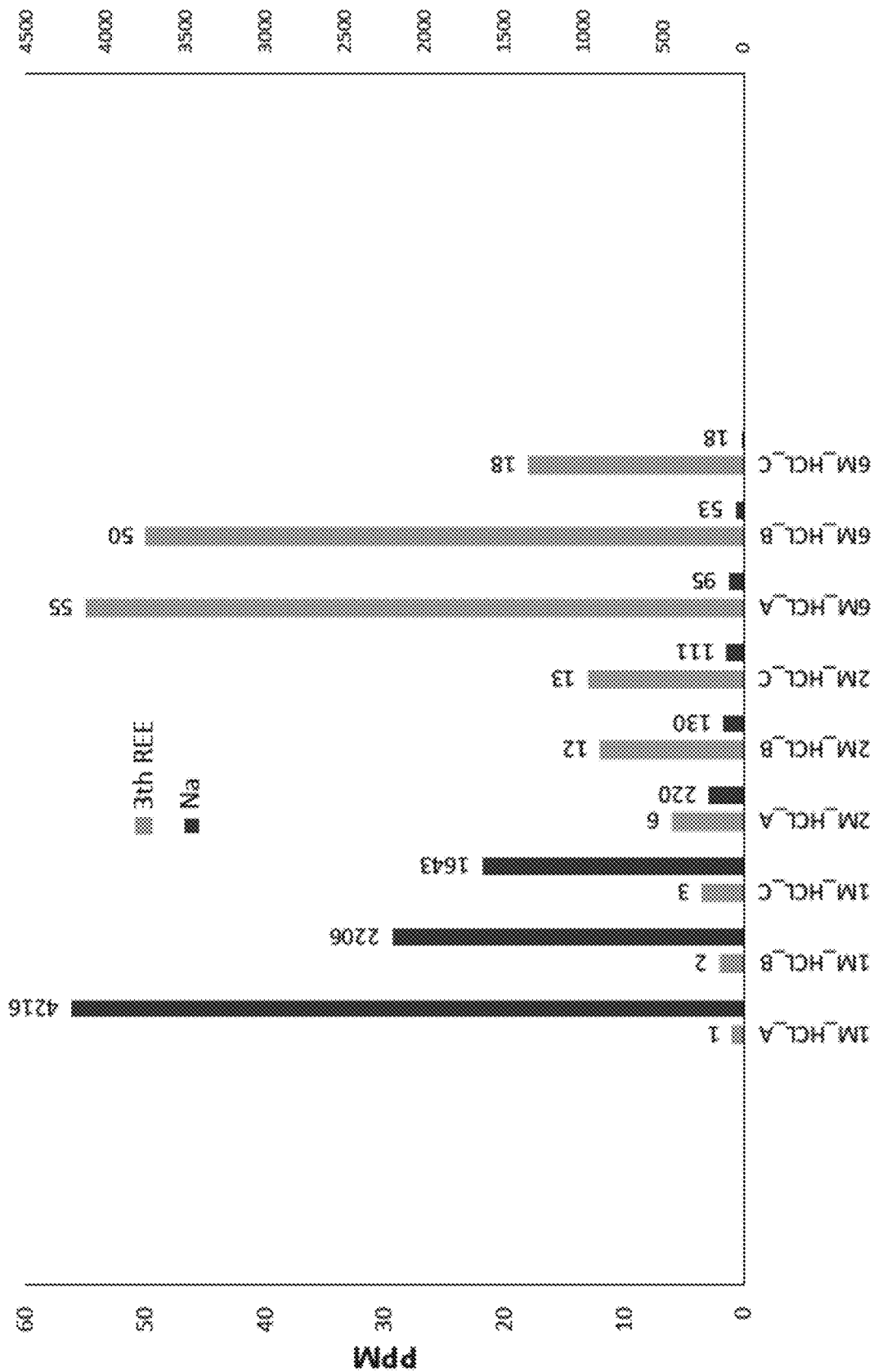
FIG. 10 graphically illustrates elution data from an exemplary Stage 1 cation CIX of FIG. 9.

FIG. 9 illustrates schematically the elution order from this exemplary CIX Stage 1 system. FIG. 10 graphically illustrates elution data from Stage 1 cation CIX. This shows that metals (Sodium, Na shown here) come out of the columns at a 1 M acid solution and the REEs don't come out until a 6M HCl.

Stage 2 Separations.

In alternative embodiments, following stage 1 we have (greater than 70%) REEs that have eluted off in the 6M HCl section of the stage 1 scheme. In alternative embodiments, the next stage 2 process is the separate these REEs into 3 different fractions. A light, mid and heavy fraction.

| Lights Individual REE, 314.88 ppm | Mids Individual REE, 107.56 ppm | Heavies Individual REE 33.06 ppm |
|---|---|---|
| SC - 29.76 | Pr - 9.63 | Tb - 1.95 |
| Y- 8.05 | Nd - 63.29 | Dy - 8.05 |
| La - 62.92 | Sm - 13.66 | Ho - 10.24 |
| Ce - 214.15 | Eu - 4.27 | Er - 5.85 |
|  | Gd -16.71 | Tm - 1.46 |
|  |  | Yb - 4.51 |
|  |  | Lu - 1.00 |

The results after Stage 2 that show the REE's divided up into three fractions. Lights, Mids, Heavies.

Stage 3 Separations.

In alternative embodiments, this column is packed with an absorbent stationary phase and the mobile phase comprises chelating agents. In alternative embodiments, this stage of separations is reserved for production of REE and REE derivatives (such as REE-oxalate, REE-glycolate, REE-lactate, REE-EDTA) in purities of 95% or greater. In an example, five elements were chosen and purified to higher than 95% purity as shown by our internal testing.

Reagent Recycle.

In alternative embodiments, the leaching and Stage 1 CIX system require that a significant amount of acid be present but not necessarily consumed. In order to recover and recycle this acid in the process we have used pressurized membrane systems.

In an example, a sample of REE leached from coal overburden with hydrochloric acid was put onto an acid stable membrane to concentrate REE from the acid solution into a small volume thereby improving extraction of REE's and simultaneously permeate clean HCl acid for reuse in the leaching process. In alternative embodiments, The simultaneous upgrading of the REE concentration and purification of HCl has the potential to improve and reduce the entire cost of REE extraction.

REE Concentration and Acid Purification Process Description

A small volume, 7 liters, was passed through an acid stable NF/RO membrane. The membrane rejects REE there by concentrating the REE's but permeates HCl acid for reuse in the leaching process and operating at 1500 psig.

Bench Test Process Set-Up

Figure 11:
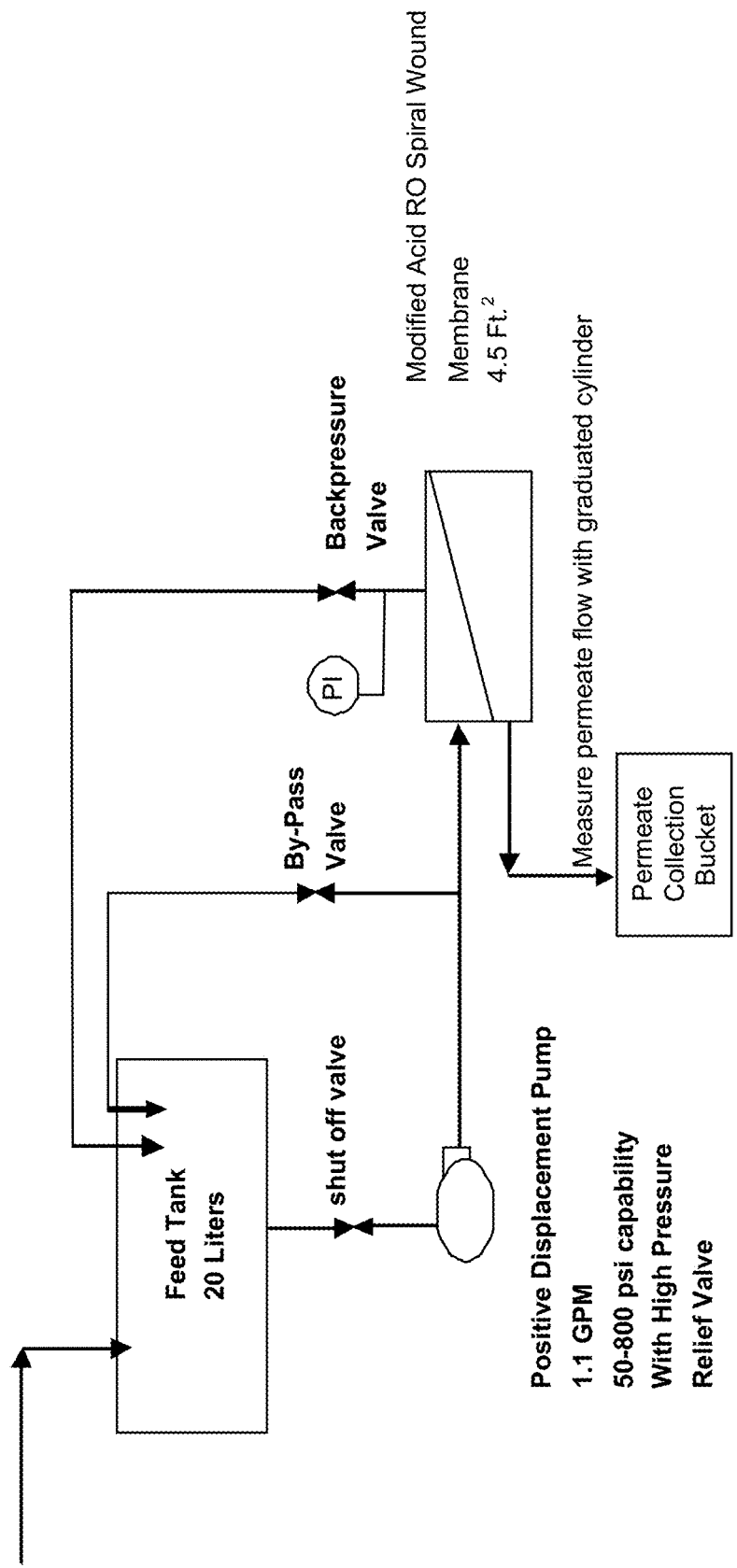
FIG. 11 illustrates schematically illustrates an exemplary small element bench test configuration, as discussed in detail, below.

An exemplary bench unit set-up P+I diagram is schematically illustrated in FIG. 11. The system uses a small spiral wound special modified RO module to purify the processed REE acid.

Although the feed acid was quite clean, the actual industrial process can use a polymeric hollow fiber UF as pre-treatment, hence this feed water was pretreated with UF and then transferred to the feed tank. In order to achieve maximum recovery in our bench test the concentrate is returned back to the feed tank until we had recovered about 40% of feed as clean permeate. To insure recovery was mass balanced properly the initial feed, final permeate, and concentrate were weighed.

The modified acid RO element was base line tested on tap water test solution to make sure it had proper flux and rejection based MDS specifications. The modified RO, referred to as APE, is the only membrane capable of permeating HCl, but rejecting REE's.

The Pass 1 tests for APE membrane were run at 50° C. to 60° C. and 800 psig but normalized to 1500 psig to reflect the flux at elevated pressures needed to overcome the osmotic pressure of the sample. The membrane flux data being expressed as LMH (liters/meter/hour).

Figure 12:
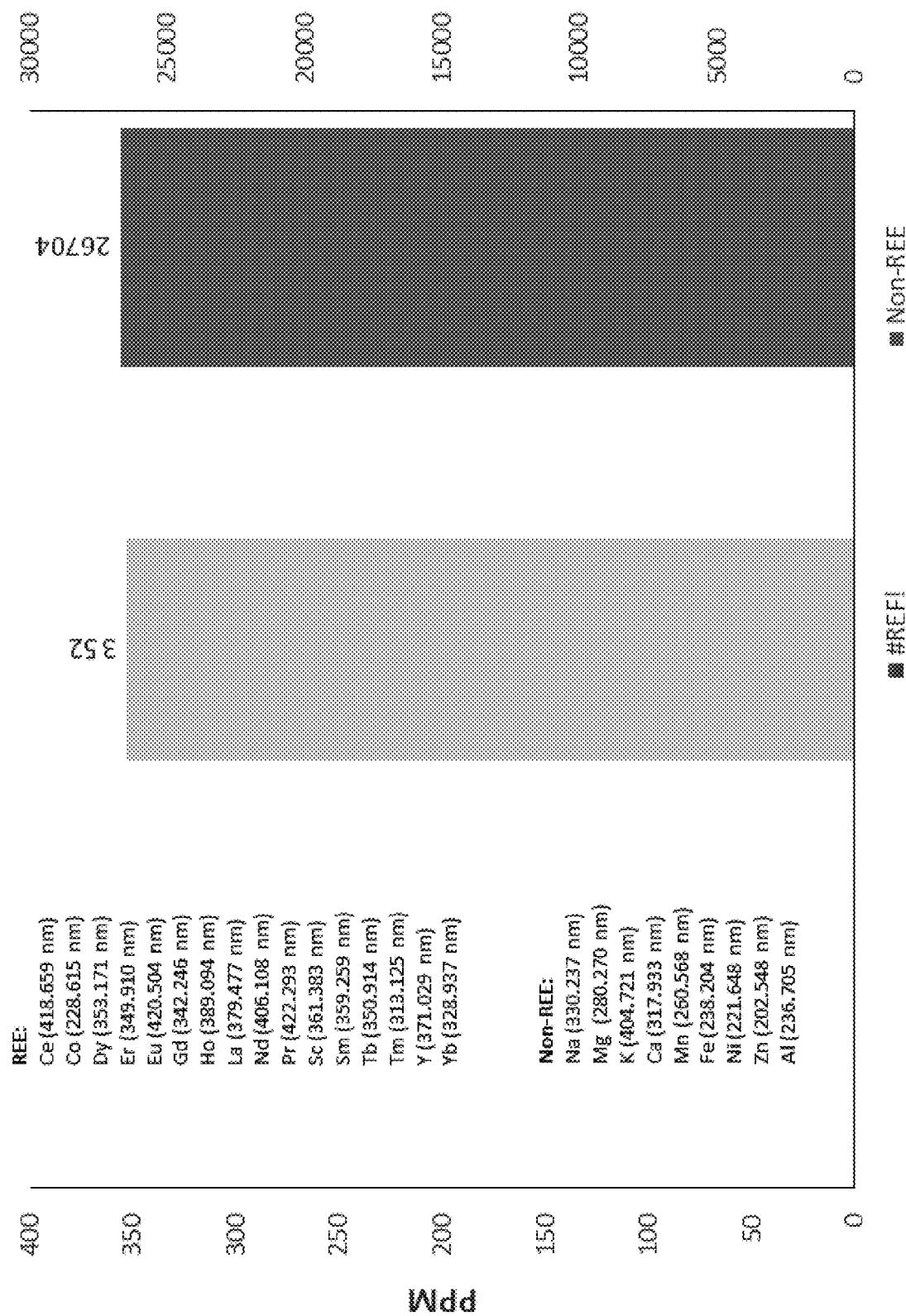
FIG. 12 graphically illustrates a feed analyses for an exemplary modified RO, APE, Membrane, as discussed in detail, below.
Figure 13:
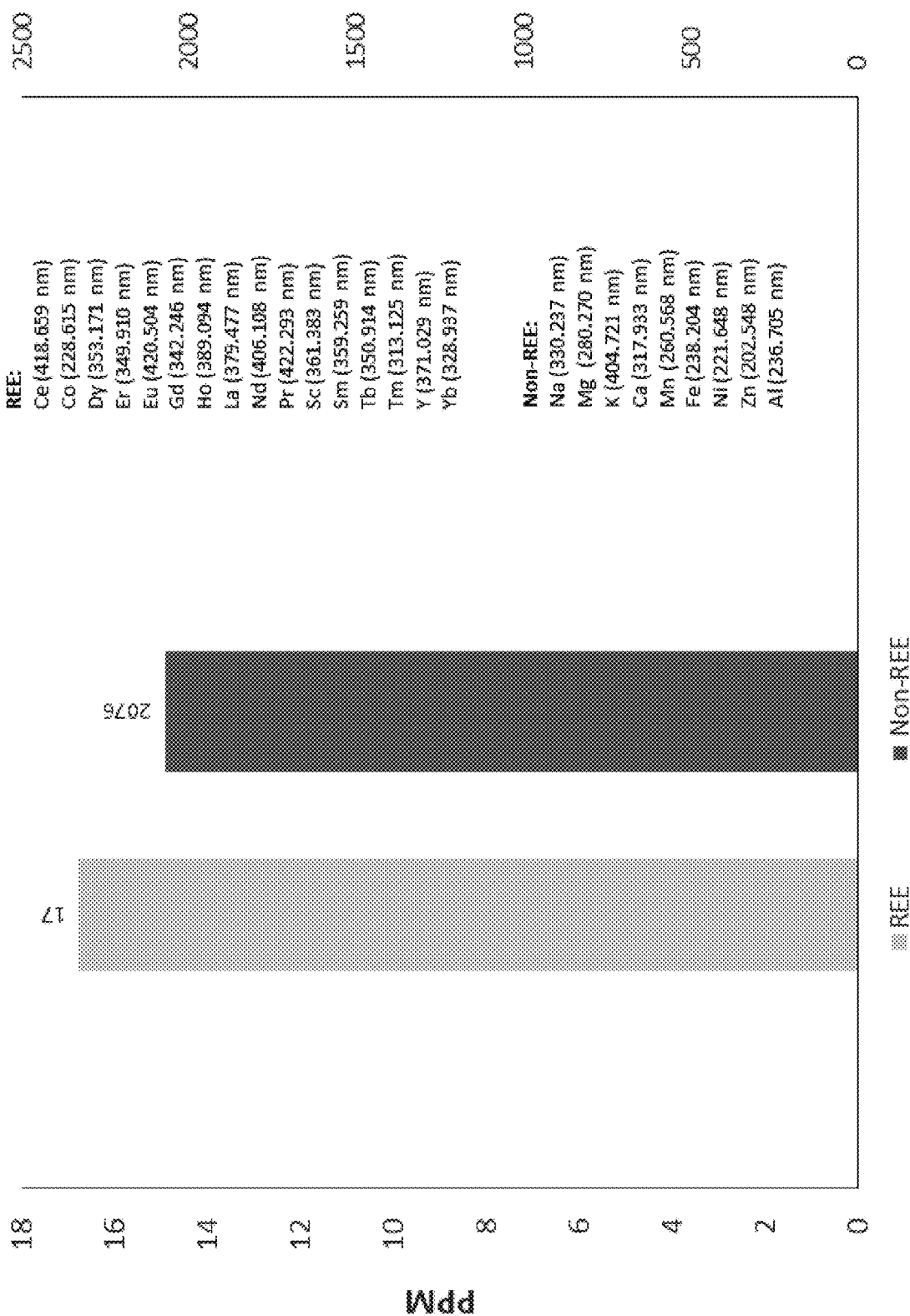
FIG. 13 graphically illustrates a membrane permeate analyses of an exemplary modified RO, APE, Membrane, as discussed in detail, below.

FIG. 12 (Feed) and FIG. 13 (membrane permeate) illustreat an analyses of the Feed and Permeate for the exemplary modified reverse osmosis (RO), APE, Membrane. These data are consistent with other REE tests we have run on the modified RO acid stable microfluidic diffusional sizing (MDS) membrane, APE. The overall REE rejection is 96.2% and based on past experience the heavy REE's (the most valuable) are rejected at 98.5% to 99% be the membrane.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

A number of embodiments of the invention have been described. Nevertheless, it can be understood that various modifications may be made without departing from the spirit and scope of the invention. Accordingly, other embodiments are within the scope of the following claims.

What is claimed is:

1. A continuous ion exchange/continuous ion chromatography (CIX/CIC) process for the separation of rare earth elements (REEs) and non-rare earth elements from a feedstock starting material comprising at least one rare earth element (REE) and at least one non-rare earth element and having iron as a contaminant, comprising sequential use of a CIX/CIC anion exchange resin column to first remove ferric tetrachloride anion $FeCl_4^-$ followed by a CIX/CIC cationic exchange resin column to isolate REEs, the method comprising the steps of:
(a) providing the feedstock starting material comprising at least one rare earth element (REE) and at least one non-rare earth element and having iron as a contaminant;
(b) making a modified feedstock by a process comprising mixing the feedstock starting material in a hydrochloric acid (HCl) solution, or adding the feedstock starting material to the hydrochloric acid solution, wherein the hydrochloric acid solution has a concentration of between about 0.01 molarity and 10 molarity, wherein the iron reacts with the HCl in the presence of chlorides to generate a plurality of $FeCl_4^-$ anion complexes,
thereby generating a modified feedstock starting material comprising the hydrochloric acid
(c) adding or loading the modified feedstock starting material of step (b) into or onto a CIX/CIC anion exchange resin column, whereby the ferric tetrachloride anion $FeCl_4^-$ in the modified feedstock starting material is retained on the CIX/CIC anion exchange resin, and generating a first eluate;
(d) adding or loading the first eluate of (c) into or onto a CIX/CIC cationic exchange resin column, whereby REEs are retained on the CIX/CIC cationic exchange resin; and
(e) passing low to high gradient acid eluting solutions over or through the CIX/CIC cationic exchange resin column to generate a second eluate comprising REE,
wherein the passing comprises:
(i) first passing a first HCl acid-comprising eluting solution having a low HCl acid concentration of about 0.1 to 1 molarity thereby generating a second eluate wherein greater than about 50% of monovalent and/or divalent cations are eluted off the CIX/CIC cationic exchange resin column in the second eluate, followed by a second HCl acid-comprising eluting solution of about 1 to 2 HCl acid molarity thereby generating a third eluate wherein greater than about 50% of trivalent cations are eluted off the CIX/CIC cationic exchange resin column in the third eluate, followed by a third HCl acid-comprising eluting solution of about 3 to 10 or more HCl acid molarity thereby generating a fourth eluate wherein greater than about 50% of the REEs elute off the CIX/CIC cationic exchange resin column in the fourth eluate, or
(ii) passing an HCl acid-comprising eluting solution over or through the cationic exchange resin column, wherein the HCl acid-comprising eluting solution changes over time from: a first HCl acid-comprising eluting solution comprising about 0.1 to 1 HCl acid molarity thereby generating a second eluate wherein greater than about 50% of monovalent and/or divalent cations are eluted off the CIX/CIC cationic exchange resin column in the second eluate, to a second HCl acid-comprising eluting solution comprising about 1 to 2 molarity thereby generating a third eluate wherein greater than about 50% of trivalent cations are eluted off the CIX/CIC cationic exchange resin column in the third eluate, to a third HCl acid-comprising eluting solution comprising about 3 to 10 or more HCl acid molarity thereby generating a fourth eluate wherein greater than about 50% of the REEs elute off the CIX/CIC cationic exchange resin column in the fourth eluate;

thereby separating rare earth elements (REEs) and non-rare earth elements from the feedstock.

2. The process of claim 1, wherein the at least one of the eluted REEs comprises lanthanum (La); cerium (Ce); praseodymium (Pr); neodymium (Nd); samarium (Sm); europium (Eu); gadolinium (Gd); terbium (Tb); dysprosium (Dy); holmium (Ho); erbium (Er); thulium (Tm); ytterbium (Yb); lutetium (Lu); yttrium (Y), scandium (Sc) or any combination thereof.

3. The process of claim 1, wherein the non-rare earth elements comprise metals or metal oxides.

4. The process of claim 3, wherein the metals or metal oxides comprise iron or iron oxides, or aluminum or aluminum oxides.

5. The process of claim 4, wherein the metals or metal oxides comprise iron or iron oxides, or aluminum or aluminum oxides.

6. The process of claim 1, wherein the feedstock starting material comprises a mining waste, an acid mine drainage (AMD), an acid rock drainage (ARD), an acid or metalliferous drainage, AMD sludge, a coal overburden, a fire clay, a fly ash, an ore or any combination thereof.

7. The process of claim 1, wherein the CIX/CIC anion exchange resin comprises a polymeric matrix to which functional groups are attached.

8. The process of claim 7, wherein the functional groups comprise: tertiary amino groups; primary amines; secondary amines; quaternary ammonium groups or a combination thereof.

9. The process of claim 7, wherein the polymeric matrix comprises:
$N^+(CH_3)_3$ groups (type 1 resins);
—$N^+(CH_3)_2C_2H_4OH$ groups (type 2 resins); or,
a combination thereof.

10. The process of claim 7, wherein the polymeric matrix comprises styrene-divinylbenzene.

11. The process of claim 1, further comprising regenerating the CIX/CIC anion exchange resin after step (c) to generate a fifth eluate, wherein the CIX/CIC anion exchange resin having
ferric tetrachloride anion $FeCl_4^-$ retained thereon is regenerated by adding or loading a water elution solution through the CIX/CIC anion exchange resin and eluting off ferric tetrachloride anion $FeCl_4^-$, and any zinc, thorium and/or uranium if present, to generate the fifth eluate comprising $FeCl_3$,
wherein the water dilutes the $FeCl_4^-$ and any zinc, thorium and/or uranium if present, and generates $FeCl_3$ which is not anionic and therefore not attracted to the anion exchange resin.

12. The process of claim 11, further comprising collecting and recycling the fifth eluate comprising $FeCl_3$.

13. The process of claim 1, wherein the CIX/CIC cationic exchange resin comprises crosslinked polystyrene, divinylbenzene or a combination thereof, or comprises sulfonic acid groups, carboxylic acid groups or a combination thereof.

14. The process of claim 1, wherein in step (c) any zinc, thorium and/or uranium in the modified feedstock starting material is retained on the CIX/CIC anion exchange resin column.

15. The process of claim 1, wherein the trivalent cations comprise aluminum cations.

16. The process of claim 1, wherein in step (e) (ii) at low acid concentration of about 1 molarity or less at least about 60% of monovalent and/or divalent cations are eluted off the CIX/CIC cationic exchange resin column.

17. The process of claim 16, wherein in step (e) (ii) at low acid concentration of about 1 molarity or less at least about 95% of monovalent and/or divalent cations are eluted off the CIX/CIC cationic exchange resin column.

18. The process of claim 1, wherein in step (e) (ii) at acid concentrations of between about 1 to 2 molarity greater than about 60% of trivalent cations elute off the CIX/CIC cationic exchange resin column.

19. The process of claim 18, wherein in step (e) (ii) at acid concentrations of between about 1 to 2 molarity greater than about 95% of trivalent cations elute off the CIX/CIC cationic exchange resin column.

20. The process of claim 1, wherein in step (e) (ii) at acid concentrations greater than about 3 or more molarity, greater than about 60% of the REEs elute off the CIX/CIC cationic exchange resin column.

21. The process of claim 20, wherein in step (e) (ii) at acid concentrations greater than about 3 or more molarity, greater than about 70% of the REEs elute off the CIX/CIC cationic exchange resin column.

22. The process of claim 21, wherein in step (e) (ii) at acid concentrations greater than about 3 or more molarity, greater than about 95% of the REEs elute off the CIX/CIC cationic exchange resin column.

23. The process of claim 1, wherein the feedstock starting material comprises a coal byproduct or a coal overburden product.

24. The process of claim 1, wherein the first eluate has greater than about 99.8% of the contaminant iron removed.

* * * * *